(12) United States Patent
Partridge

(10) Patent No.: US 9,305,594 B2
(45) Date of Patent: Apr. 5, 2016

(54) CABLE HAVING AUDIO RECORDING AND PLAY BACK

(71) Applicant: GE Aviation Systems Limited, Cheltenham (GB)

(72) Inventor: Lucas William Partridge, Romsey (GB)

(73) Assignee: GE AVIATION SYSTEMS LIMITED, Cheltenham (GB)

(*) Notice: Subject to any disclaimer, the term of this patent is extended or adjusted under 35 U.S.C. 154(b) by 218 days.

(21) Appl. No.: 13/861,735

(22) Filed: Apr. 12, 2013

(65) Prior Publication Data

US 2014/0142735 A1    May 22, 2014

(30) Foreign Application Priority Data

Nov. 16, 2012 (GB) .................................. 1220596.9

(51) Int. Cl.
*G11B 20/10* (2006.01)
*H04B 3/56* (2006.01)
*H02G 3/00* (2006.01)

(52) U.S. Cl.
CPC ............ *G11B 20/10527* (2013.01); *H04B 3/56* (2013.01); *H02G 3/00* (2013.01); *H02G 2200/20* (2013.01); *H04B 2203/5483* (2013.01)

(58) Field of Classification Search
CPC ......... G02B 6/3895; H02G 3/00; H02G 3/04; H02G 3/28; H02G 3/286; H02G 2200/20; H02J 7/0047; H04B 3/46; H04L 65/1069; H04M 1/24; H04M 3/229; H04R 3/00; H04R 5/04; H04R 27/00; H04R 29/00; H04R 2227/005; H04R 2420/09

USPC .............. 174/112, 60; 324/542, 66; 370/352; 379/21, 25, 29.01, 67.1; 381/58; 386/E5.002; 439/489, 912; 700/94

See application file for complete search history.

(56) References Cited

U.S. PATENT DOCUMENTS

2003/0086537 A1*  5/2003  Schultz ...................... 379/32.05
2011/0057711 A1    3/2011  Hung et al.

FOREIGN PATENT DOCUMENTS

WO          2009024114 A1     2/2009

OTHER PUBLICATIONS

"Mini Microphone Mike & Speaker for Apple iPod Nano 4G", available on amazon.co.uk since Oct. 1, 2009.
O'Connor, "TalkingPlug Uses RFID-Enabled Power Outlets for Energy Management", RFID Journal, pp. 1-2, Nov. 17, 2009.
"Mini Mic and Speaker for iPod Touch / Black", available on play.com since Feb. 26, 2010.
"Sony develops "Authentication Outlet" Where Electricity Use can be Managed and Consumed on a Per-User and Per-Device Basis", Feb. 14, 2012.

(Continued)

*Primary Examiner* — Paul McCord
*Assistant Examiner* — Alexander Eljaiek
(74) *Attorney, Agent, or Firm* — GE Global Patent Operation; William S. Munnerlyn

(57) ABSTRACT

A cable for transmitting a transmissible element, such as power or data, from a source to a device, the cable includes at least a first plug configured to mate with at least one of the source and the device, and an audio player for playing back audio recording.

18 Claims, 2 Drawing Sheets

(56) References Cited

OTHER PUBLICATIONS

Brodkin, "Authenticated electricity: Sony power outlets will charge you for charging", Mar. 15, 2012.

Combined Search and Examination Report issued in connection with corresponding GB Application No. GB1220596.9 dated Jan. 23, 2013.

* cited by examiner

CABLE HAVING AUDIO RECORDING AND PLAY BACK

CROSS-REFERENCE TO RELATED APPLICATIONS

This application claims priority under 35 U.S.C. §119 to British Patent Application No. 12205969, filed Nov. 16, 2012, the disclosure of which is incorporated herein by reference.

BACKGROUND OF THE INVENTION

Cables for transmissible elements, such as power or data, provide for transmission of the transmissible elements from a source to a destination. Such cables have a variety of applications, and are well-suited for long or short distance transmission between resources or devices. The cables typically have a plug at each end for connecting to the source and destination, respectively. In a multiple cable implementation, where multiple cables are connected to at least one of the source and destination, identification of the plugs for a single cable require the physical tracing of the cable from one to the other of the source and destination.

BRIEF DESCRIPTION OF THE INVENTION

In one aspect, a cable for transmitting a transmissible element, such as power or data, from a source to a device, the cable includes a cord terminating in first and second opposing ends, at least a first plug provided on one of the first end and second end and configured to mate with at least one of the source and the device, and an audio player having a recording medium on which is stored a pre-recorded audio recording, wherein a user may play back the pre-recorded audio recording.

In another aspect, a cable for transmitting a transmissible element, such as power or data, from a source to a device, includes a cord terminating in first and second opposing ends, a first plug provided on the first end and configured to mate with the source, a second plug provided on the second end and configured to mate with the device, an audio recorder, and an audio player, wherein a user may record an audio recording, such as the identity of the source or device, for example, and play back the audio recording.

DESCRIPTION OF EMBODIMENTS OF THE INVENTION

Figure 1:
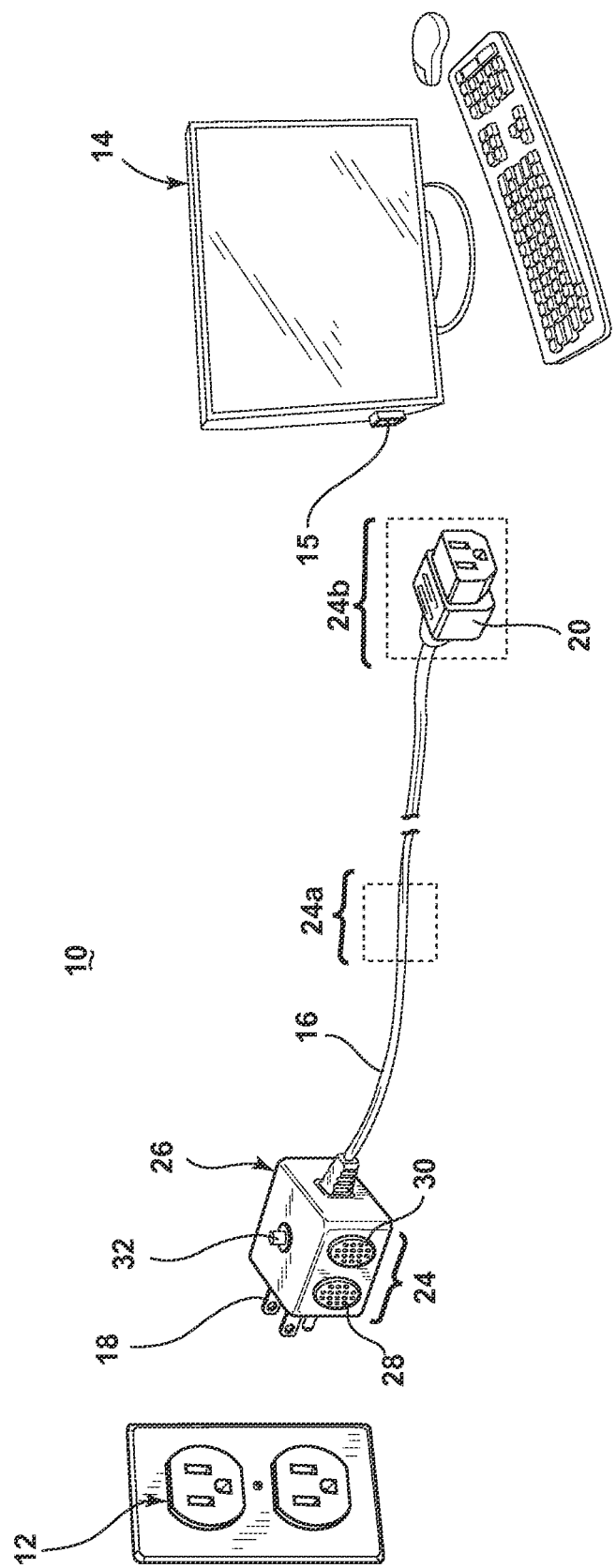
FIG. 1 is a perspective view of a cable, in the form of an electrical power cable, with an audio recorder and an audio player positioned on the first plug.

The embodiments of the present invention are related to a cable for transmitting at least one transmissible element. Any type of transmissible element is envisioned, examples of which include electrical or optical transmissions. Moreover, any purpose may be served by the transmissible element, such as providing power or data for transmittal. In the embodiment of FIG. 1, an electric power cable 10, as illustrated, transmits power from a source, shown as a typical female wall socket 12, to a device, shown as a typical desktop computer 14 having a receiving port 15 for a power connection.

The power cable 10 comprises a cord 16, having a terminating first end plug, illustrated as a male wall plug 18, and a terminating second opposing end plug, illustrated as a female computer power plug 20. Both the male wall plug 18 and female computer power plug 20 are configured to mate with their respective source, a female wall socket 12, and device, a desktop computer 14.

The power cable 10 further comprises an integrated recording/playback unit (RPU) 24 defined by a housing 26 having an audio recorder, shown as a microphone 28, an audio player, shown as a speaker 30, and an input device, shown as a button 32. The button is of a typical input device construction, wherein depression of the button 32 registers an input signal.

Although specific examples of a microphone 28 and a speaker 30 are described or embodied, it will be understood that many different embodiments exist and may be applied for either component. Additionally, although separate devices for the speaker 30 and microphone 28 are illustrated, it is possible to use a single device, such as a transducer, for both the audio recorder and audio player components.

While an electric power cable 10 is illustrated to demonstrate a cable for transmitting a transmissible element, any type of cable capable of transmission is envisioned. Suitable types of cables include fiber optic cable, differential signal cables, coaxial cables, twisted-wire cables, or any other transmission or propagation cable. Furthermore, it is understood that the cables may be comprised of one or more transmission lines.

Additionally, the first and second terminating ends may be plugs to any combination of at least one source and at least one device, respectively, for the transmissible elements. This includes, but is not limited to, cables with a second end having further connectable devices, such as extension cords, surge protectors, universal serial bus (USB) cables, HDMI cables, and plug adapters.

Moreover, it is understood that although the RPU 24 is shown integrated into the first plug, alternate integrating of the RPU 24 at the second plug or with the cord 16, in-between plugs, is imagined. Illustrative examples of a few of the possible alternative locations are shown in dashed lines and labeled 24a, 24b, et. seq.

Figure 2:
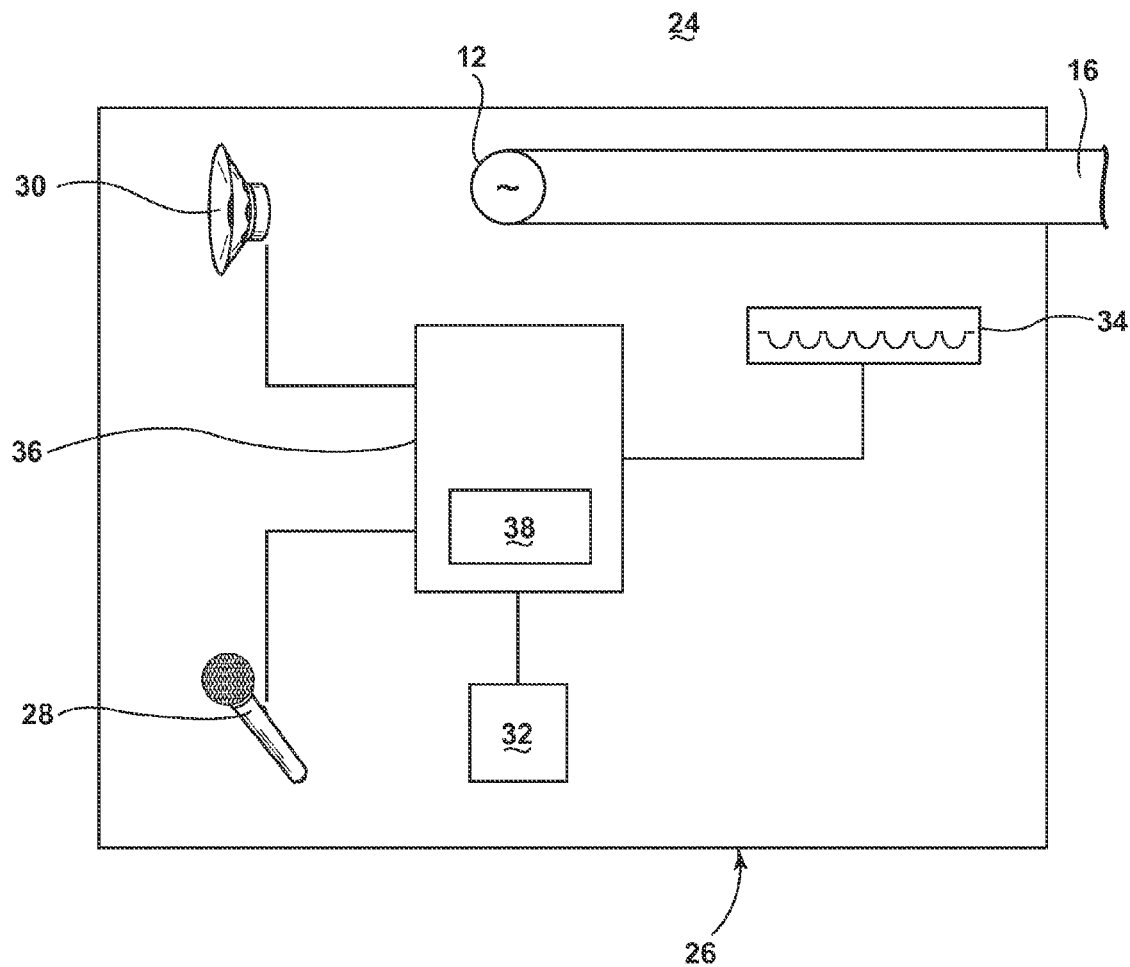
FIG. 2 is a schematic view of the cable of FIG. 1.

Referring to FIG. 2, the RPU 24 further comprises an inductor 34 positioned in proximity to the cord 16, and a controller 36 coupled to the inductor 34, a memory device 38, the speaker 30, the microphone 28, and the button 32. The memory device 38 is configured to provide a rewritable recording storage medium for the controller, wherein audio recordings may be saved to, as well as read from, for audio recording playback. As embodied, the memory device 38 may be any analog or digital storage device wherein audio recordings may be saved and retrieved in a variety of analog or digital formats.

The inductor 34 operates to generate power in response to the proximate magnetic field, produced by the transmission of electricity to the desktop computer 14 over the cord 16 when the male wall plug 18 is joined with the female wall socket 12, supplying power to the controller 36. In instances where the power cable 10 does not transmit electricity, or the electricity transmitted produces an insufficient magnetic field for powering the controller 36, other power sources, such as a battery or direct connection to the electricity transmitted, are envisioned.

The button 32 operates in such a way that multiple input signals may be interpreted by the controller 36. In the current embodiment, for instance, a short button depression (lasting less than 5 seconds) generates a first input signal, while a long button depression (lasting longer than 5 seconds) generates a second input signal.

The controller 36 operates in response to a first or second input signal by decoding a stored audio recording from the memory device 38 and playing said recording on the speaker 30, or by receiving the audio input received by the microphone 28 and digitally storing said audio to the memory device 38, respectively.

The power cable 10 operates in such a way that the user may record an audio recording, such as the identity of a source or device, to the power cable 10 by a long depression of the button 32, generating the second input signal, and speaking the name or identifying information toward the microphone 28. When a user wants to play back the audio recording, for example when the user does not recall the identity of a source or device, the user may trigger a short depression of the button 32, generating the first input signal, which in turn plays back the recorded audio recording through the speaker 30.

Additional configurations are envisioned wherein multiple buttons may be used to generate different input signals, and additional input signals may be used to, for example, erase the saved audio recording from the memory device 38 without recording a replacement audio recording. Moreover, the invention is not intended to be limited by buttons as the input signals, as switches, sliders, capacitive touch indicators, or any other input-signal-generating device operates with substantial similarity. Furthermore, it is understood that the power cable 10 may use additional identifiers, such as audio tones, light-emitting diodes (LEDs), or vibrational elements, to instruct the user on the functionality of the device. For instance, a low tone may indicate to start the audio recording and a high tone may indicate the playback is complete.

The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the power cable 110 operates, at a minimum, audio recording play back, on a cable that is integrated into the device at the second terminating end, without the need for a second plug. For example, in the second embodiment, a desktop computer 114 comprises a power cable 110 having terminating first and second ends wherein the first end is exemplified as a male wall plug 118 and the second is integrally formed into the desktop computer 114.

In this embodiment, should the power cable 110 cable operate with both user-recorded audio recording and audio recording play back functionality, the cable will include similar recording components and operation as in the first embodiment. However, should the power cable 110 operate with only audio recording play back functionality, the cable does not need to include a microphone 28, the memory device 138 need not be rewriteable, and the audio recording stored in the memory device 138 may be pre-recorded. Consequently, any depression of the button 132 will only generate a first input signal, which in turn plays back the audio recording, identifying the source or device, through the speaker 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power cable for transmitting from a source to a device, the power cable comprising:
   a cord terminating in first and second opposing ends;
   a first plug provided on the first end and configured to mate with the source;
   a second plug provided on the second end and configured to mate with the device;
   a recording/playback unit integrated in the cord between the first plug and the second plug, and having an audio recorder, an audio player, a controller, and a memory device, wherein the recording/playback unit is powered via the transmission of power from the source to the device over the cable.

2. The cable of claim 1 wherein the cord comprises at least one transmission line over which a transmissible element is transmitted.

3. The cable of claim 2 wherein the transmission line is at least one of an electrical and optical conductor.

4. The cable of claim 1 wherein the location of the recording/playback unit is provided on at least one of the first plug, or the second plug.

5. The cable of claim 1 wherein the audio recorder comprises a microphone and the audio player comprises a speaker.

6. The cable of claim 5 further comprising a transducer, with the audio recorder using the transducer as the microphone and the audio player using the transducer as the speaker.

7. The cable of claim 1 wherein at least one of the audio recorder and the audio player includes the memory device.

8. The cable of claim 7 wherein at least one of: the audio recorder records to the memory device, or the audio player reads from the memory device.

9. The cable of claim 8 further comprising an inductor that generates power for the recording/playback unit in response to the magnetic field produced by transmission of power to the device over the cord.

10. The cable of claim 1 wherein at least one of the audio recorder and the audio player comprises at least one input device providing for play back and audio recording.

11. The cable of claim 1 wherein at least one of the audio recorder and the audio player comprises the controller providing for at least one of audio recording and playback.

12. A power cable for transmitting power from a source to a device, the power cable comprising:
    a cord terminating in first and second opposing ends;
    at least a first plug provided on one of the first end and the second end and configured to mate with at least one of the source and the device;
    a second plug provided on the other of the first end and the second end and configured to mate with the other of the source and the device;
    an audio player having a recording medium on which is stored an audio recording disposed between the first and second opposing ends of the cord; and
    an inductor that generates power for the audio player in response to the magnetic field produced by transmission of power to the device over the cord.

13. The cable of claim 12 wherein the audio recording identifies the source or device.

14. The cable of claim 12 wherein the cord comprises at least one transmission line over which a transmissible element is transmitted.

15. The cable of claim 12 wherein the location of the audio player is provided on the first plug.

16. The cable of claim 12 wherein the audio player comprises a speaker providing for audio play back.

17. The cable of claim 12 wherein the audio player comprises at least one input device providing for play back.

18. The cable of claim 12 wherein the audio recording is one of a pre-recorded audio recording and a user-recorded audio recording.

* * * * *